(12) United States Patent
Jessus et al.

(10) Patent No.: US 8,024,280 B2
(45) Date of Patent: Sep. 20, 2011

(54) ACADEMIC FILTER

(75) Inventors: Nicolas Jessus, London (GB); Justin Victor, Dartford (GB)

(73) Assignee: Yahoo! Inc., Sunnyvale, CA (US)

( * ) Notice: Subject to any disclaimer, the term of this patent is extended or adjusted under 35 U.S.C. 154(b) by 734 days.

(21) Appl. No.: 11/644,288

(22) Filed: Dec. 21, 2006

(65) Prior Publication Data

US 2008/0154833 A1    Jun. 26, 2008

(51) Int. Cl.
*G06F 17/00* (2006.01)
*G06N 5/02* (2006.01)

(52) U.S. Cl. ......................................... 706/47
(58) Field of Classification Search ............ 707/E17.089
See application file for complete search history.

(56) References Cited

U.S. PATENT DOCUMENTS

| | | | |
|---|---|---|---|
| 2002/0042784 A1* | 4/2002 | Kerven et al. | 706/12 |
| 2004/0043362 A1* | 3/2004 | Aughenbaugh et al. | 434/118 |
| 2005/0079477 A1* | 4/2005 | Diesel et al. | 434/350 |
| 2005/0080795 A1* | 4/2005 | Kapur et al. | 707/100 |
| 2006/0143564 A1* | 6/2006 | Bates et al. | 715/533 |

OTHER PUBLICATIONS

'Adaptive Web-Based Educational System Using Neural Neyworks in EFL Course': Masun, Apr. 2006, IEEE, 0-7803-9521, pp. 622-625.*

'Finding the WRITE stuff: Automatic identification of discourse structure in student essays': Burstein, 2003, IEEE, 1094-7176, pp. 32-39.*

'Dynamic rules' score adjustment in spam filter using users 'feedback': Wang, 2005, IEEE, 0-7803-9091, pp. 665-669.*

Sanz-Valero, J. Brazilian academic search filter: application to the scientific literature on physical activity. Rev Saude Publica 2010; 44(5) [online], 2010 [retrieved on May 2, 2011]. Retrieved from the Internet:<URL: http://www.scielo.br/pdf/rsp/v44n5/en_1041.pdf>.*

* cited by examiner

*Primary Examiner* — Omar F Fernandez Rivas
*Assistant Examiner* — Peter Coughlan
(74) *Attorney, Agent, or Firm* — Hickman Palermo Truong & Becker LLP (57) ABSTRACT

Techniques are described herein for analyzing textual responses to questions by evaluating the responses according to varying sets of rules. The text of a response is analyzed against the sets of rules and a series of values are generated as a result of, and based upon, the analysis. These values are calculated to determine a score value for the response, which is compared to a threshold value and/or to the scores of other responses to the same or a different question. The score value of the response is used to determine the likelihood of the response containing useful information in response to the question. Also, based on the third numerical value, the text of the response is displayed on a web page according to a specified format or order.

34 Claims, 4 Drawing Sheets

ACADEMIC FILTER

FIELD OF THE INVENTION

The present invention relates to text analysis and, more specifically, to automatically evaluating the text of responses to questions.

BACKGROUND

The growth of the Internet has allowed people from all parts of the world to communicate with each other at a rapid pace. This capacity for immense sharing of knowledge has led to the creation of websites devoted to enabling people to tap into the expertise of others in ways never before imagined. These knowledge-sharing social sites are designed to allow users to ask questions and receive answers from other users.

A drawback to the wide availability of users able to post answers to questions is the increased amount of noise to signal; that is, the more answers posted to a question, the greater the amount of uninformed guesses, banter, and otherwise irrelevant user contributions that must be waded through in order to find quality responses.

For example, in response to a question about automobile repair, there may be one hundred responses, or "answers". Of these one hundred answers, if only ten percent are worthwhile, that means a user must read 90 answers that either give wrong information, no information, or incomplete information. The more difficult it becomes for a user to find quality answers to her questions, the less likely the user is to frequent the web site. If this occurs on a large enough scale, then fewer users will visit the website, thereby reducing the audience available to answer questions and lessening the scope of knowledge.

One approach to filtering out lower-quality answers is human interaction. Humans may read answers and manually remove or identify answers that are deemed uninformative. A drawback to this approach is that it is time- and labor-intensive, and requires a large number of people to continuously monitor answers. Also, human moderation of answers may be prone to personal biases, either about what is considered an "appropriate" answer to a question in a particular subject or about the individual answering the question.

Therefore, an approach for determining the quality of posts on a web site or message board, which does not experience the disadvantages of the above approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for analyzing textual responses to questions by evaluating the responses according to varying sets of rules. The text of a response is analyzed against the sets of rules and a series of values are generated as a result of, and based upon, the analysis. These values are calculated to determine a score value for the response, which is compared to a threshold value and/or to the scores of other responses to the same or a different question. The score value of the response is used to determine the likelihood of the response containing useful information in response to the question. Also, based on the third numerical value, the text of the response is displayed on a web page according to a specified format or order.

According to an embodiment, text is received as input, and a first numerical value based on a first analysis of the text according to a first set of rules is generated. A second numerical value is generated based on a second analysis of the text according to a second set of rules that are different that the first set of rules. Based at least in part on the first and second numerical values, a score is generated for the text and the likelihood of the text containing useful information is determined based on the score.

According to an embodiment, input comprising text is received wherein the text comprises an answer to a question. The text of the answer is processed through a first filter, wherein the processing comprises performing a first analysis of the text based on a first selected set of rules. Based on the analysis, a first numerical value is generated. The text of the answer is processed through a second filter, wherein the processing comprises performing a second analysis of the text based on a second selected set of rules, wherein the second set of rules are different than the first set of rules. Based on the analysis, a second numerical value is generated. A third numerical value is generated based at least in part on the first and second numerical values; and based on the third numerical value, the likelihood of the answer containing a useful answer to the question is automatically determined.

Architectural Overview

Figure 1:
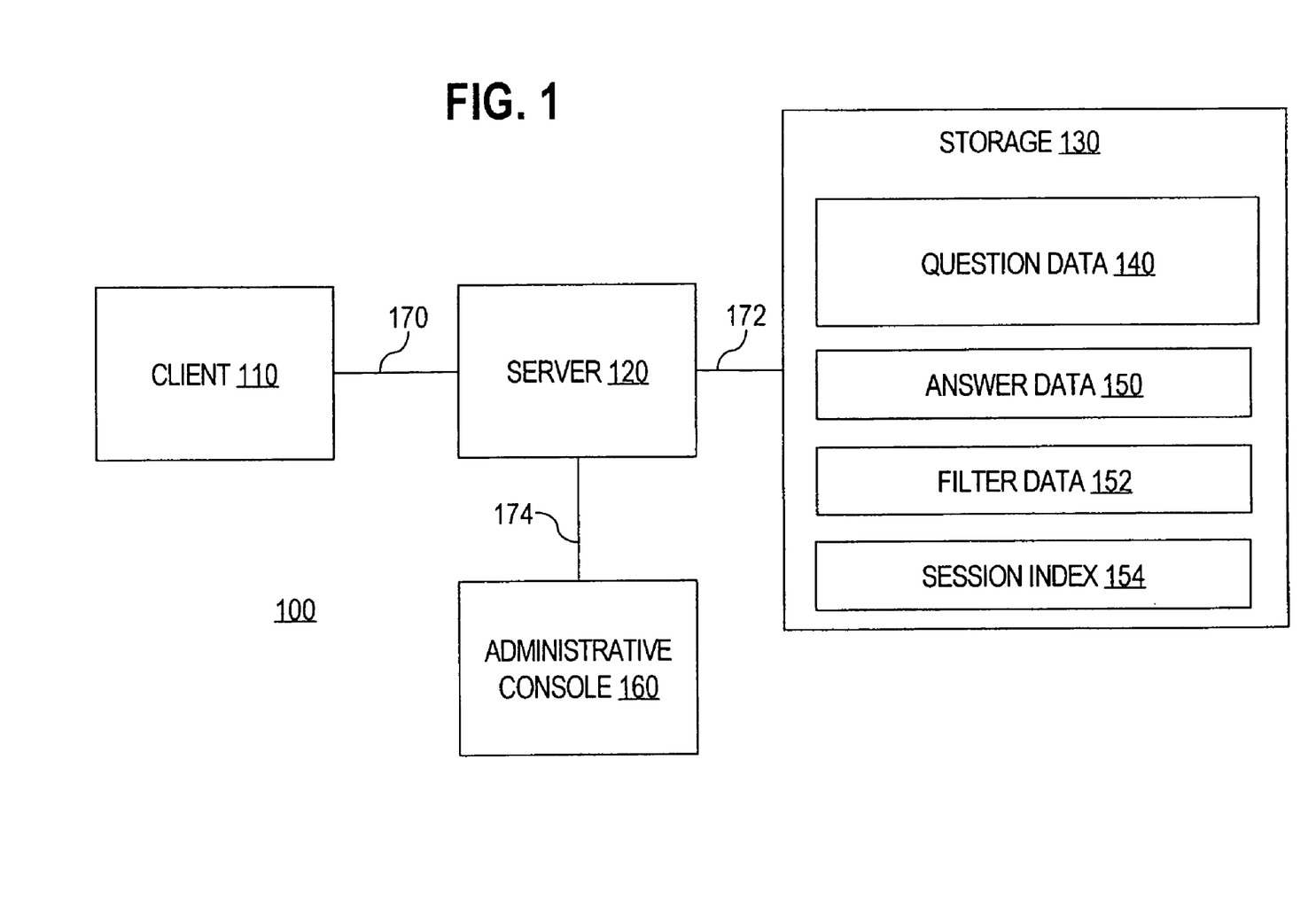
FIG. 1 is a block diagram of a system according to an embodiment of the invention.

FIG. 1 is a block diagram of a system 100 according to an embodiment of the invention. Embodiments of system 100 may be used to evaluate text of responses to questions in accordance with an embodiment of the invention.

In the embodiment depicted in FIG. 1, system 100 includes client 110, server 120, storage 130, question data 140, answer data 150, filter data 152, a session index 154, and an administrative console 160. While client 110, server 120, storage 130, and administrative console 160 are each depicted in FIG. 1 as separate entities, in other embodiments of the invention, two or more of client 110, server 120, storage 130, and administrative console 160 may be implemented on the same computer system. Also, other embodiments of the invention (not depicted in FIG. 1), may lack one or more components depicted in FIG. 1, e.g., certain embodiments may not have a administrative console 160, may lack a session index 154, or may combine one or more of the question data 140, answer data 150, filter data 152, and the session index 154 into a single file.

Client 110 may be implemented by any medium or mechanism that provides for sending request data, over communications link 170, to server 120. Request data specifies a request to view a question or answer or post an answer to a question. This request data may be in the form of a user clicking a button associated with a question or answer and selecting a menu option associated with a question or answer.

The server, after processing the request data, will transmit to client 110 response data that makes available for display the question or answer, or provides a data entry area in which a user may type an answer to a question. While only one client 110 is depicted in FIG. 1, other embodiments may employ two or more clients 110, each operationally connected to server 120 via communications link 170, in system 100. Non-limiting, illustrative examples of client 110 include a web browser, a wireless device, a cell phone, a personal computer, a personal digital assistant (PDA), and a software application.

Server 120 may be implemented by any medium or mechanism that provides for receiving request data from client 110, processing the request data, and transmitting response data that identifies the one or more requested questions or answers to client 110.

Storage 130 may be implemented by any medium or mechanism that provides for storing data. Non-limiting, illustrative examples of storage 130 include volatile memory, non-volatile memory, a database, a database management system (DBMS), a file server, flash memory, and a hard disk drive (HDD). In the embodiment depicted in FIG. 1, storage 130 stores the question data 140, answer data 150, filter data 152, and session index 154. In other embodiments (not depicted in FIG. 1), the question data 140, answer data 150, filter data 152, and session index 154 may be stored across two or more separate locations, such as two or more storages 130.

Question data 140 represents data defining a question that the client 110 may request to view or answer. Answer data 150 is data that defines one or more answers as described herein. Filter data 152 is data that defines one or more filters as described herein. Session index 154 is an index that may be used to determine which question data 140 and answer data 150 was requested and/or used by a particular user.

Administrative console 160 may be implemented by any medium or mechanism for performing administrative activities in system 100. For example, in an embodiment, administrative console 160 presents an interface to an administrator, which the administrator may use to add questions to the question data 140, add answers to the answer data 150, add filters to the filter data 152, remove or edit questions from the question data 140, remove or edit answers to the answer data 150, remove or edit filters to the filter data 152, create an index (such as session index 154) on storage 130, or configure the operation of server 120.

Communications link 170 may be implemented by any medium or mechanism that provides for the exchange of data between client 110 and server 120. Communications link 172 may be implemented by any medium or mechanism that provides for the exchange of data between server 120 and storage 130. Communications link 174 may be implemented by any medium or mechanism that provides for the exchange of data between administrative console 160, server 120, and storage 130. Examples of communications links 170, 172, and 174 include, without limitation, a network such as a Local Area Network (LAN), Wide Area Network (WAN), Ethernet or the Internet, or one or more terrestrial, satellite or wireless links Academic Filtering Academic filtering is defined as applying heuristics and patterns of answers known to provide wrong or less useful information in the past to evaluate current answers to questions. According to an embodiment, a user may post a question on a web site or web forum. Users read the question and may input answers to the question, some of which may be displayed. According to an embodiment, an object is to determine which answers employ a high level of language, and display these answers, while identifying answers that lack a high level of language and either not displaying these answers or displaying them in such a manner to identify the answers as unlikely to contain useful information.

The assumption behind this approach is that answers, also called user posts, may be identified as more or less likely to provide useful information because elaborate and grammatically correct language correlates positively with well-reasoned and reliable information. By evaluating the language of a user post, posts that can be described as "academic" may be preserved and promoted while posts consisting of less useful information may be filtered out. The described approaches of academic filtering may be utilized in such a way as to allow a great deal of flexibility in determining what posts are likely to be useful.

According to an embodiment, academic filtering comprises the use of filters, or a set of sequential operations applied to a post through which the text of the post is processed. Each operation, or filter, assigns a numerical value to the post based on human-defined and Bayesian heuristics. According to an embodiment, these values are solely numerical, and may represent a concrete number (e.g., number of sentences) or abstract number (e.g., complexity index of the grammar used). Each value ranks the post on a given characteristic (e.g., spelling, grammar complexity). The values have significance when compared to indicator values set from experience by a human, or indicator values set from supervised statistical analysis of texts according to Bayesian analysis. In addition, values may serve as a threshold to discard a post without further processing and regardless of other scores (e.g., if the post exhibits many spelling mistakes).

After all operations have been completed on a post, the raw numerical values assigned as a result of the filter processing and text comparison may be multiplied or otherwise altered by a specified or customizable weighting factor and then calculated to result in a single numeric or alphanumeric value associated with the post. According to an embodiment, the numerical value may be defined positively; that is, bad punctuation increases the numerical value, while correct punctuation does not, or the numerical value may be defined negatively; that is, the use of rare words decreases the numerical value while the use of common words does not.

According to an embodiment, one filter applied to a post may be a punctuation filter. This filter accepts as input text comprising a user post and checks the punctuation of the post by comparing the post to a set of specified punctuation rules. For example, the punctuation filter may receive as input a sentence where two independent clauses are joined by a comma, and check this usage against a specified set of punctuation rules. If the specified set of punctuation rules contains a rule of, "If two or more clauses, grammatically complete and not joined by a conjunction, are to form a single compound sentence, the proper mark of punctuation is a semicolon," then the usage would be determined to be incorrect and the numerical value calculated by the punctuation filter would be increased, according to an embodiment, or decreased, according to an embodiment.

According to an embodiment, a filter such as a punctuation filter may analyze the post for specific traits defined to be common to "noise" posts; i.e., posts that are likely not to contain useful information. One example of a trait that may signify a higher likelihood of a noise post may be the use of rows of periods as whitespace. Upon detecting the use of rows of periods as whitespace, and after comparing the trait with the set of specified rules, if the specified rules contains a rule whereby rows of periods used as whitespace are likely to indicate a noise post, then the numerical value calculated by the filter would be increased, according to an embodiment, or decreased, according to an embodiment.

According to an embodiment, another filter applied to a post may be a spelling filter. This filter accepts as input text comprising a user post and checks the spelling of the post by comparing the post to a specified dictionary. According to an embodiment, only words that deviate by a specified distance from a common word located in the specified dictionary are considered, in order to attempt to avoid penalizing acronyms and jargon. According to an embodiment, this acceptable degree of deviation may be customized such that any word that is not found in the specified dictionary is considered a misspelling. According to an embodiment, based on the number of misspellings found in a post, the numerical value calculated by the spelling filter would be increased, according to an embodiment, or decreased, according to an embodiment.

According to an embodiment, another filter applied to a post may be a slang filter. This filter accepts as input text comprising a user post and checks each word against a specified listing of "slang" words and usage. For example, a post wherein the letter "u" is used in place of the word "you" would be penalized according to an embodiment. According to an embodiment, the use of "L33t speak" and SMS-like word usage is indicative of a post that is unlikely to provide quality information. According to an embodiment, based on the number of slang terms or usage found in a post, the numerical value calculated by the slang filter would be increased, according to an embodiment, or decreased, according to an embodiment.

According to an embodiment, another filter applied to a post may be an "elaborateness" filter. This filter accepts as input text comprising a user post and performs operations such as checking the ratio of multi-syllabic words; checking the rarity of the words used in the post; identifying the presence of specialized words such as "kernel" in the computer context or "manifold" in the automobile context; and evaluating the complexity of the grammar, for example, the use of prepositional phrases and semicolons. According to an embodiment, this filter operates by using standard language analysis techniques along with common and technical dictionaries. According to an embodiment, based on the number of multi-syllabic words found in a post, the ratio of rare words to common words found in a post, the presence of specialized words in the post, and the complexity of the grammar used in the post, the numerical value calculated by the slang filter would be increased, according to an embodiment, or decreased, according to an embodiment.

According to an embodiment, another filter applied to a post may be a grammar filter. This filter accepts as input text comprising a user post and checks each sentence against a specified compilation of proper grammar usage. For example, the grammar filter may check whether "a" or "an" is used immediately preceding a word beginning with a consonant or vowel, and based on such comparisons, the numerical value calculated by the slang filter would be increased, according to an embodiment, or decreased, according to an embodiment.

According to an embodiment, a post is normalized to a reasonable standard of spelling, punctuation, and typographical conventions before processing can take place, both to avoid statistical inaccuracies and to reduce the complexity of the programming needed. For example, spelling mistakes are corrected prior to analysis based on a set of grammar rules, since a badly-spelled word could be taken for a rare word or a proper noun, setting it in an inaccurate light against the threshold values. Punctuation is fixed so that, for example, multiple exclamation marks are not mistaken by further processing for meaningful sentences of length 0. Typographical conventions are enforced so that, for example, closing quotation marks before and after a full stop are treated in an identical way by further processing.

According to an embodiment, at least two filters are used to analyze a post, and the exact nature of each filter may be defined in any manner. Although certain filters are described in a particular order above, it should be understood that in other embodiments one or any number of filters may be utilized in a different order or overlapping in time.

According to an embodiment, after all designated filters have processed the text of the post and a numerical value has been assigned to the post, all the numerical values are retrieved and calculated together to create an academic index, which is a numeric value or score that defines a post in its entirety with regard to the likelihood of the post containing useful or academic information. According to an embodiment, each numerical value assigned based on the filter processing a filter may be weighted according to a specified or customizable amount prior to being included in the calculation of the academic index. For example, a user my select the desired weights to assign to each filter through the use of user input such as a drop-down box or text input box. Specified weighting may be made available for a user to select; for example, a user may select a "heavy grammar" weighting from a drop-down dialog box in which the numerical score assigned by the grammar filter would be more heavily weighted in the calculation of the academic index.

According to an embodiment, the filters may be given weight depending on the locale or language of the user posting the answer; for example, a long sentence in English may be indicative of a post more likely than not to provide a good answer, while this may not be the case for an answer submitted in French.

By adjusting the weights given to the filters, the results of the academic filtering process may result from very strict; i.e., very few answer will qualify as being more likely to contain good information, to very lax; i.e., very few answers will be designated as less likely to contain good information. According to an embodiment, this adjustment may be made by a user browsing the answers.

After the academic index is calculated, it is compared to a threshold numerical value, and based on the comparison, the answer is designated as more or less likely to contain useful information. According to an embodiment, if the academic index is below the threshold numerical value, the post is designated as less likely to contain useful information, and vice versa. According to an embodiment, a graduated scale of "usefulness" is used to evaluate the degree to which a post is more or less likely to contain useful information. As examples, the usefulness scale may be on a 1-5 scale, with 1 being the lowest likelihood of a post containing useful information and 5 the highest likelihood, or the scale may be on a percentage basis, in that the academic index is calculated to be a specific percentage higher or lower than the threshold numerical value. The usefulness scale of a post may be displayed to a user along with the post or used to make a determination whether to display the answer or not.

According to an embodiment, the scores or numeric values calculated to create the scores for one or more answers may be compared and ranked based on the corresponding scores, and then the answers may be displayed or presented to a user based on the ranking. For example, answers with higher scores, or higher numeric values generated as the result of analysis by one or more particular filters, may be displayed at the top of a web page while the lower-ranked answers are displayed beneath then higher-ranked answers. According to an embodiment, answers with a score falling beneath a specified threshold may be treated differently than answers not falling beneath a specified threshold by being discarded or simply not displayed.

According to an embodiment, the input text may comprise an electronic mail (e-mail) message, and the message may be analyzed by one or more filters and numerical values and scores generated as a result as described herein. Based on a comparison of the score to a threshold value or other scores, the e-mail message may be marked as a particular type, such as spam, or promoted to a higher rank than lower-scoring messages, or stored in a special folder.

Figure 2:
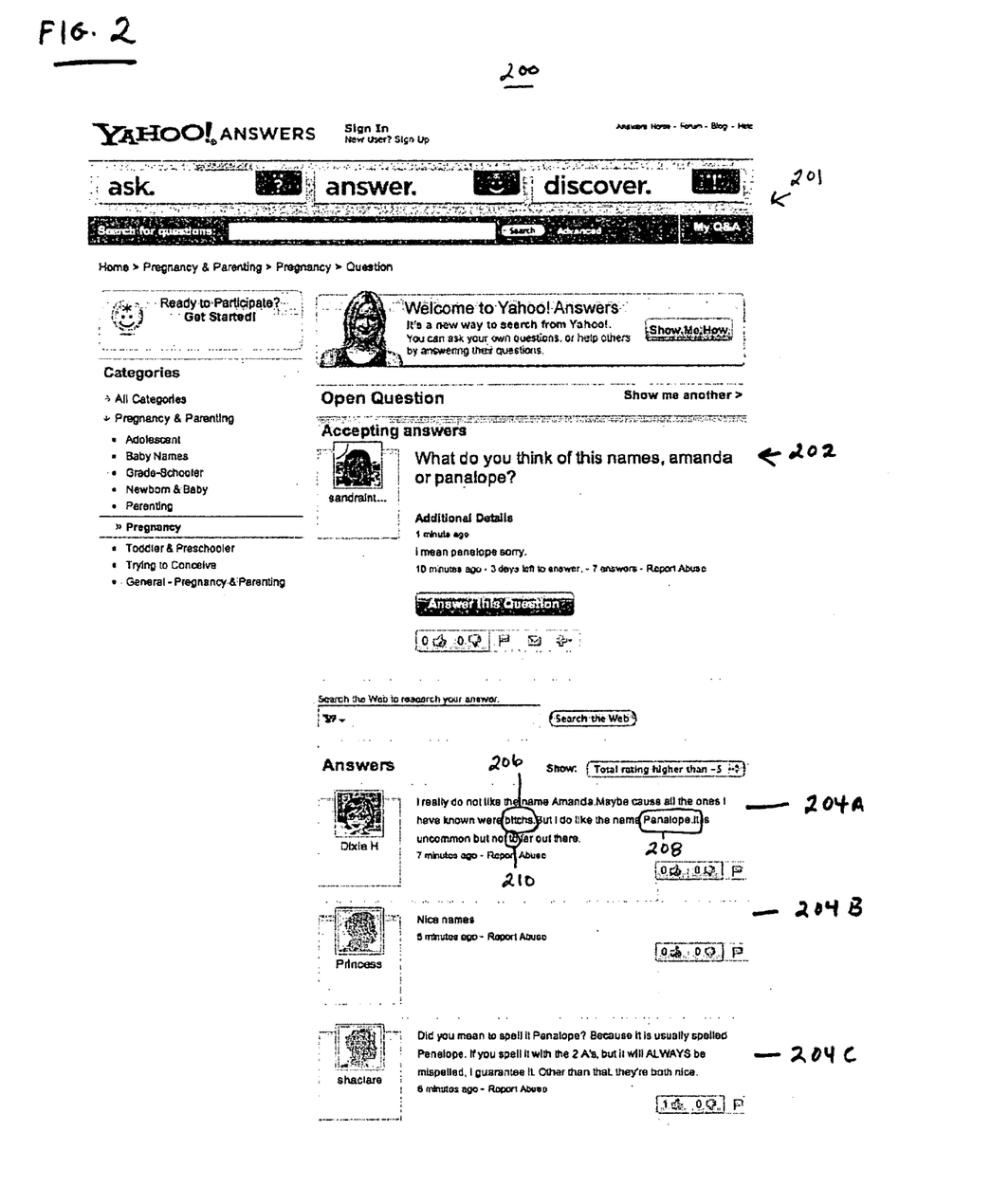
FIG. 2 is a block diagram illustrating a display of questions and answers according to an embodiment of the invention.

FIG. 2 is a block diagram 200 illustrating an example website displaying questions and answers according to an embodiment of the invention. According to an embodiment, a question 202 is displayed on a web site 201. The web site 201 may be a standard web site described by HTML, or it may be a web forum created in PHP, or it may take any number of variations. A user posts a question 202 and it is displayed for other users to read and respond to. In FIG. 2, there are three answers 204A-204C displayed.

Some examples of grammar, spelling, elaborateness and slang are herein described as may be evaluated by a filter as previously discussed. The first answer 204A contains a spelling error and slang usage with regard to the term "b!tchs. 206" The spelling filter may detect this word as a misspelling and the numerical value assigned to the post would be affected as a result of the detection, as described earlier. Further, the use of "b!tchs" may be identified as slang by the slang filter if, for example, the curse word "bitches" were in the slang dictionary with wildcards for the vowels or explicitly spelled "b!tchs". The first answer 204A also contains a grammar error 208 wherein no space is provided between the period following the word "Panalope" and the word "It". The first answer 204A also contains a spelling error 210 as the word "to" should be spelled "too." Upon processing of this post by the selected filters, the numerical value assigned as the result of the filter processing would be affected by each of the aforementioned errors.

Figure 3:
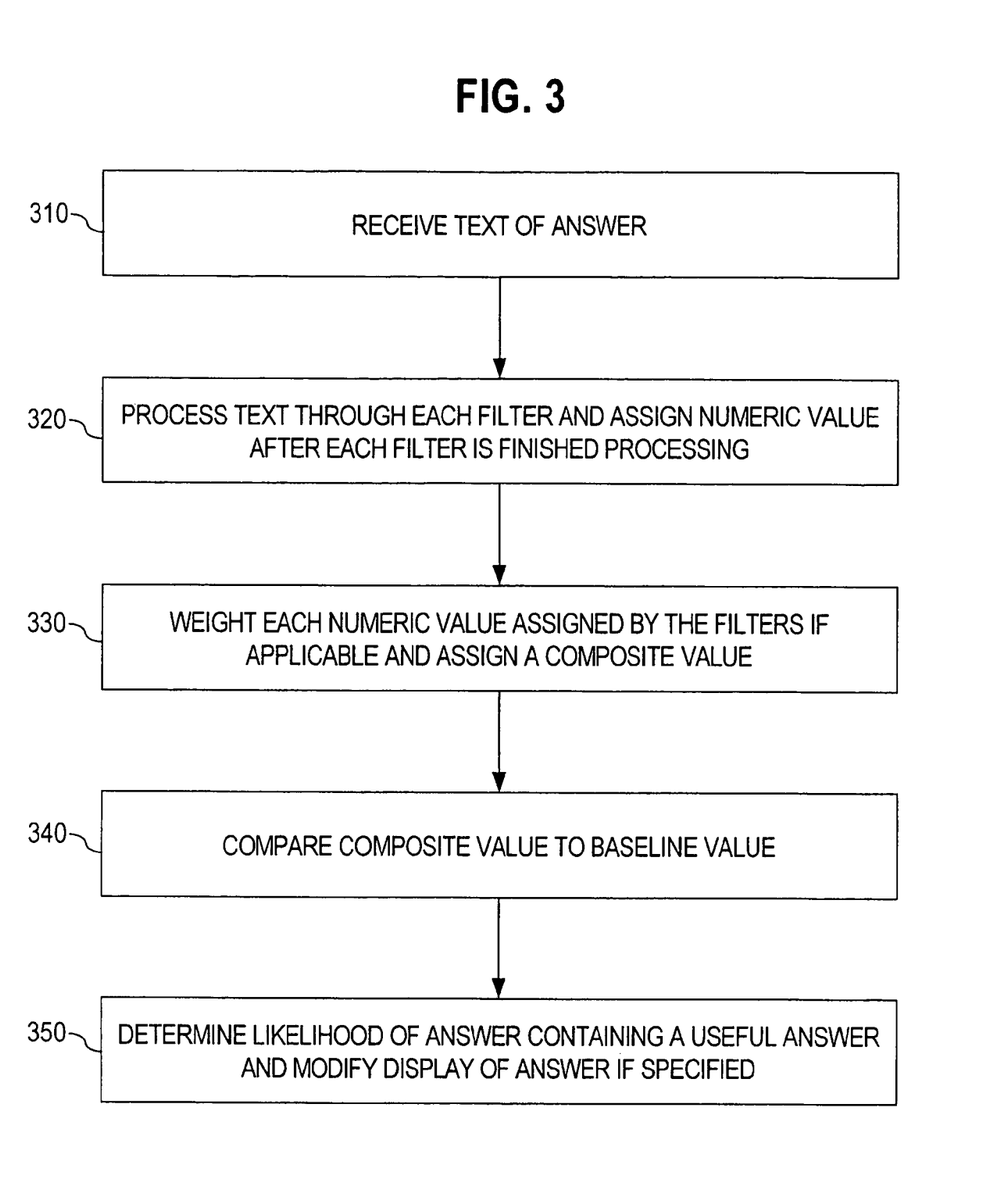
FIG. 3 is a flowchart illustrating the functional steps of automatically assessing the quality of a written answer to a question according to an embodiment of the invention.

FIG. 3 is a flowchart illustrating the functional steps of automatically assessing the quality of a written answer to a question, according to an embodiment of the invention. In step 310, input is received comprising text of a user post. In step 320, the input text is processed through a filter as described earlier. The input text may be processed through one filter at a time or through several filters simultaneously, and the nature of each filter is customizable. Each filter, after processing the text, either acts to assign a numeric or alphanumeric value to the post or causes a numeric or alphanumeric value to be assigned to the post. According to an embodiment, this numeric or alphanumeric value is based upon the comparison of the input text to a specified set of rules, and whether the assessed value is increased or decreased as a result of the input text failing to adhere to the specified set of rules is dependent upon the particular embodiment.

In step 330, after all filters chosen to process the particular input text have finished processing the text and assigned a numeric or alphanumeric value is based upon the comparison of the input text to a specified set of rules, each individual value assigned as a result of the processing may be weighted. Each weight may be part of a specified template or individually chosen by a user or automatically. The weight may be in the form of multiplying the individual value by a percentage or another form, depending on the embodiment. According to an embodiment, a user may select which filters are weighted more heavily in the final calculation of a value, as described herein. According to an embodiment, the weighting of the values assigned as a result of the filter processing may be specified, for example if the language in which the answers are given has differing measures of evaluating text, or if the particular subject in which the answers are being given is prone to use of slang, for example, and the use of slang does not necessarily correlate with an answer that is less likely to contain useful information.

In step 340, the total value, or academic index, is compared to a baseline value, and as a result of the comparison, in step 350, the overall likelihood of the answer containing a useful, or academic, answer to the posed question is evaluated. According to an embodiment, the margin by which the academic index is greater or less than the baseline value may be considered in the determination of the likelihood of the answer containing useful information.

According to an embodiment, depending one whether the answer is determined to be more or less likely to contain useful information as a result of the comparison of values, the display of the answer may be modified. For example, an answer determined less likely to contain useful information in response to the question may not be displayed at all; or, it may be emphasized or highlighted in some manner, or displayed in a different color, than answers determined more likely to contain a valuable answer, or academically stronger answer, to the posed question. A poor answer may be initially displayed only as the name of the answerer and a user would have to click on the answer to display it. According to an embodiment, answers determined to be more "useful" may appear higher in the display of answers; for example, "good" answers may appear directly below the question while "bad" answers appear further away down the web page.

Implementing Mechanisms

Figure 4:
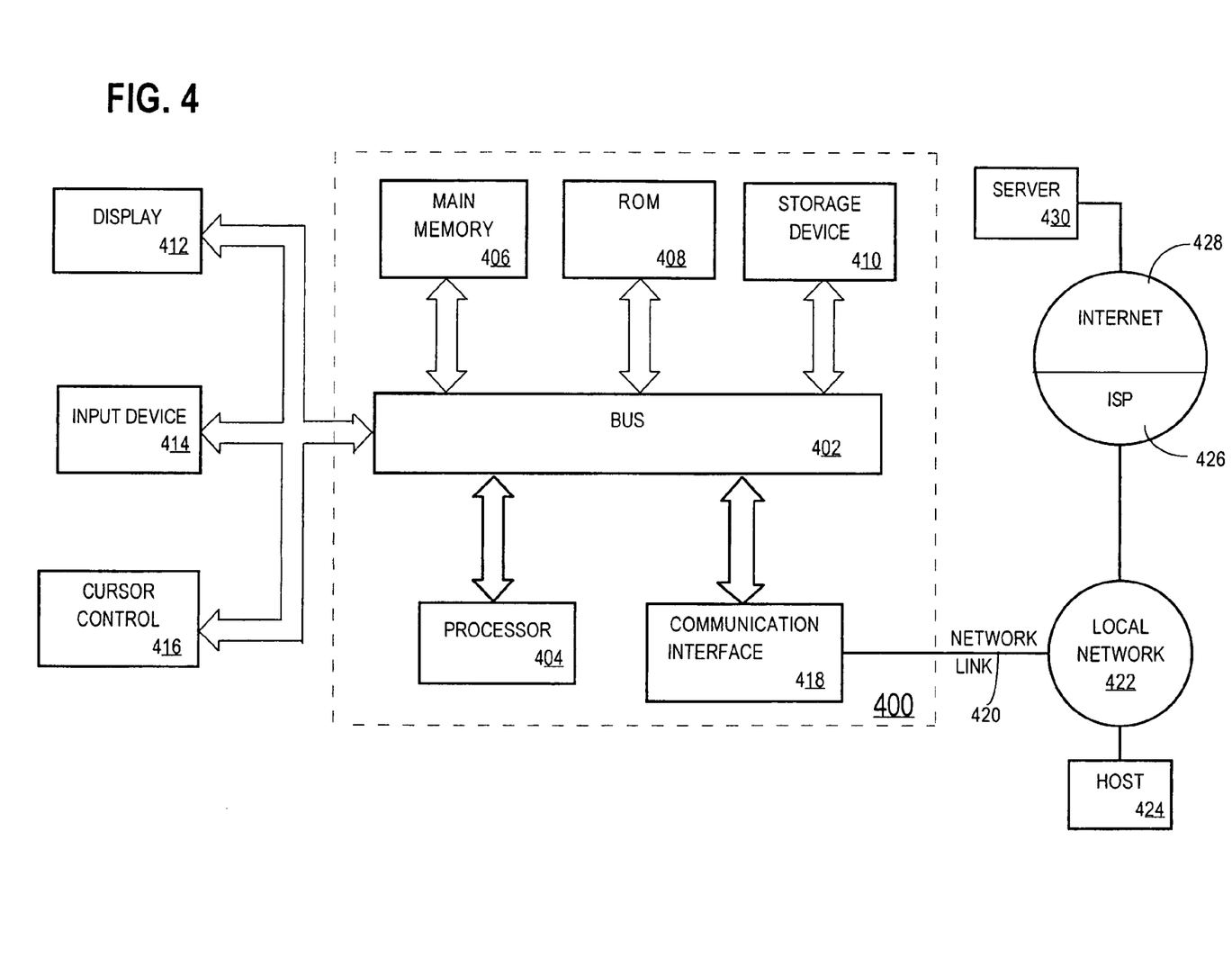
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor

404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A computer-implemented method for automatically assessing the quality of textual input, the computer-implemented method comprising the steps of:
   a website sending a webpage that includes content which, when rendered at a client, causes the client to display a question;

receiving from the client on which the web page was rendered, input that was provided by a user of the client through one or more controls on the webpage, wherein the input comprises text that indicates an answer to the question;

automatically determining whether the answer is likely to contain useful information responsive to the question on the webpage, wherein determining whether the answer is likely to contain useful information comprises:
generating a first numerical value based on a first analysis of the text;
generating a second numerical value based on a second analysis of the text;
generating a score for the text based at least in part on the first and second numerical values; and
based on the score for the text, performing at least one of:
a) determining, based on the first and second analysis of the text, whether to display the answer on subsequent pages of the website, or
b) determining, based on the first and second analysis of the text, how to display the answer on subsequent pages of the website;
wherein the second analysis is different than the first analysis;
wherein each of the first analysis and the second analysis is one of:
determining whether proper punctuation is used in said text;
determining whether correct spelling is used in said text;
determining whether slang words are used in said text;
determining whether said text contains specialized words;
determining whether said text contains words with three or more syllables;
determining whether grammar is properly used in said text; or
determining whether said text contains rare words;
wherein the method is performed by one or more computing devices.

2. The computer-implemented method of claim 1, wherein the step of generating a score for the text based at least in part on the first and second numerical values comprises multiplying the first numerical value by a first specified percentage and multiplying the second numerical value by a second specified percentage.

3. The computer-implemented method of claim 2 wherein the first specified percentage is received through user input.

4. The computer-implemented method of claim 1, wherein the text comprises an electronic mail message.

5. The method of claim 1,
wherein the first analysis involves causing the text to be processed through a first filter that is based on a first selected set of rules;
wherein the second analysis involves causing the text to be processed through a second filter that is based on a second selected set of rules.

6. The method of claim 5, wherein the question is displayed on a web page, and further comprising the step of displaying the answer on the web page if the third numerical value is greater than a threshold numerical value.

7. The method of claim 5, wherein the question is displayed on a web page, and further comprising the step of displaying the answer on the web page in a first color if the third numerical value is greater than a threshold numerical value and in a second color if the third numerical value is less than a threshold numerical value.

8. The method of claim 5, wherein the third numerical value comprises a score, and further comprising the steps of:
generating scores for a plurality of answers to the question;
determining a ranking for the answers based on the corresponding scores;
displaying the answers to a user based on the ranking.

9. The method of claim 5, further comprising applying different weights to the first and second numerical values to generate the third numerical value.

10. The method of claim 1 wherein the first analysis involves determining whether proper punctuation is used in said text.

11. The method of claim 1 wherein the first analysis involves determining whether correct spelling is used in said text.

12. The method of claim 1 wherein the first analysis involves determining whether said text contains specialized words.

13. The method of claim 1 wherein the first analysis involves determining whether grammar is properly used in said text.

14. The method of claim 1, further comprising, based on the score for the text, determining, based on the first and second analysis of the text, whether to display the text on subsequent pages of the website.

15. The method of claim 1, further comprising, based on the score for the text, determining, based on the first and second analysis of the text, how to display the text on subsequent pages of the website.

16. A non-transitory computer-readable storage medium storing one or more sequences of instructions which, when executed by one or more processors, causes the one or more processors to perform the steps of:
a website sending a webpage that includes content which, when rendered at a client, causes the client to display a question;
receiving from the client on which the web page was rendered, input that was provided by a user of the client through one or more controls on the webpage, wherein the input comprises text that indicates an answer to the question;
automatically determining whether the answer is likely to contain useful information responsive to the question on the webpage, wherein determining whether the answer is likely to contain useful information comprises:
generating a first numerical value based on a first analysis of the text;
generating a second numerical value based on a second analysis of the text;
generating a score for the text based at least in part on the first and second numerical values; and
based on the score for the text, performing at least one of:
a) determining, based on the first and second analysis of the text, whether to display the answer on subsequent pages of the website, or
b) determining, based on the first and second analysis of the text, how to display the answer on subsequent pages of the website;
wherein the second analysis is different than the first analysis;
wherein each of the first analysis and the second analysis is one of:
determining whether proper punctuation is used in said text;
determining whether correct spelling is used in said text;
determining whether slang words are used in said text;

determining whether said text contains specialized words;
determining whether said text contains words with three or more syllables;
determining whether grammar is properly used in said text; or
determining whether said text contains rare words.

17. The computer-readable storage medium of claim 16, wherein the step of generating a score for the text based at least in part on the first and second numerical values comprises multiplying the first numerical value by a first specified percentage and multiplying the second numerical value by a second specified percentage.

18. The computer-readable storage medium of claim 17, wherein the first specified percentage is received through user input.

19. The computer-readable storage medium of claim 16, wherein the text comprises an electronic mail message.

20. The computer-readable storage medium of claim 16:
wherein the text comprises an answer to a question;
wherein the first analysis involves causing the text to be processed through a first filter that is based on a first selected set of rules;
wherein the second analysis involves causing the text to be processed through a second filter that is based on a second selected set of rules.

21. The computer-readable storage medium of claim 20, wherein the question is displayed on a web page, and wherein the instructions further include instructions for displaying the answer on the web page if the third numerical value is greater than a threshold numerical value.

22. The computer-readable storage medium of claim 20, wherein the question is displayed on a web page, and wherein the instructions include instructions for displaying the answer on the web page in a first color if the third numerical value is greater than a threshold numerical value and in a second color if the third numerical value is less than a threshold numerical value.

23. The computer-readable storage medium of claim 20, wherein the third numerical value comprises a score, and the instructions include instructions for:
generating scores for a plurality of answers to the question;
determining a ranking for the answers based on the corresponding scores;
displaying the answers to a user based on the ranking.

24. The computer-readable storage medium of claim 20, further comprising instructions for applying different weights to the first and second numerical values to generate the third numerical value.

25. The computer-readable storage medium of claim 16 wherein the first analysis involves determining whether proper punctuation is used in said text.

26. The computer-readable storage medium of claim 16 wherein the first analysis involves determining whether correct spelling is used in said text.

27. The computer-readable storage medium of claim 16 wherein the first analysis involves determining whether said text contains specialized words.

28. The computer-readable storage medium of claim 16 wherein the first analysis involves determining whether grammar is properly used in said text.

29. The computer-readable storage medium of claim 16, further comprising instructions for, based on the score for the text, determining, based on the first and second analysis of the text, whether to display the text on subsequent pages of the website.

30. The computer-readable storage medium of claim 16, further comprising instructions for, based on the score for the text, determining, based on the first and second analysis of the text, how to display the text on subsequent pages of the website.

31. A computer-implemented method for automatically assessing the quality of textual input, the computer-implemented method comprising the steps of:
receiving input comprising text;
generating a first numerical value based on a first analysis of the text;
generating a second numerical value based on a second analysis of the text;
generating a score for the text based at least in part on the first and second numerical values; and
based on the score for the text, performing at least one of:
a) determining, based on the first and second analysis of the text, whether to display the text on a website, or
b) determining, based on the first and second analysis of the text, how to display the text on a website;
wherein the second analysis is different than the first analysis;
wherein the first analysis involves determining whether slang words are used in said text or determining whether said text contains words with three or more syllables;
wherein the method is performed by one or more computing devices.

32. A non-transitory computer-readable storage medium storing one or more sequences of instructions which, when executed by one or more processors, causes the one or more processors to perform the steps of:
receiving input comprising text;
generating a first numerical value based on a first analysis of the text generating a second numerical value based on a second analysis of the text;
generating a score for the text based at least in part on the first and second numerical values; and
based on the score for the text, performing at least one of:
a) determining, based on the first and second analysis of the text, whether to display the text on a website; or
b) determining, based on the first and second analysis of the text, how to display the text on a website;
wherein the second analysis is different than the first analysis;
wherein the first analysis involves determining whether slang words are used in said text or determining whether said text contains words with three or more syllables.

33. A method comprising:
a website receiving a plurality of texts;
automatically generating a plurality of scores for the plurality of texts, wherein each score in the plurality of scores has a corresponding text in the plurality of texts and is generated based on a first analysis and a second analysis of the corresponding text;
displaying on a webpage of the website a ranked list of the plurality of texts, wherein each text in the plurality of texts has a corresponding automatically generated score based on the first analysis and the second analysis of the text and is positioned in the ranked list based at least in part on the corresponding automatically generated score;
wherein the second analysis is different than the first analysis and each of the first analysis and the second analysis is one of:
determining whether proper punctuation is used in said text;
determining whether correct spelling is used in said text;
determining whether slang words are used in said text;

determining whether said text contains specialized words;

determining whether said text contains words with three or more syllables;

determining whether grammar is properly used in said text; or determining whether said text contains rare words;

wherein the method is performed by one or more computing devices.

34. A computer-readable storage medium storing one or more sequences of instructions which, when executed by one or more processors, causes the one or more processors to perform the steps of:

a web site receiving a plurality of texts;

automatically generating a plurality of scores for the plurality of texts, wherein each score in the plurality of scores has a corresponding text in the plurality of texts and is generated based on a first analysis and a second analysis of the corresponding text;

displaying on a webpage of the website a ranked list of the plurality of texts, wherein each text in the plurality of texts has a corresponding automatically generated score based on the first analysis and the second analysis of the text and is positioned in the ranked list based at least in part on the corresponding automatically generated score;

wherein the second analysis is different than the first analysis and each of the first analysis and the second analysis is one of:

determining whether proper punctuation is used in said text;

determining whether correct spelling is used in said text;

determining whether slang words are used in said text;

determining whether said text contains specialized words;

determining whether said text contains words with three or more syllables;

determining whether grammar is properly used in said text; or determining whether said text contains rare words.

* * * * *